United States Patent [19]

Stern

[11] Patent Number: 5,249,272
[45] Date of Patent: Sep. 28, 1993

[54] INTERFACE BETWEEN A RADIO CONTROL TRANSMITTER JOYSTICK CONTROL AND A COMPUTER SERIAL INPUT PORT

[75] Inventor: David R. Stern, Hinsdale, Ill.

[73] Assignee: Ambrosia Microcomputer Products, Inc., Hinsdale, Ill.

[21] Appl. No.: 565,462

[22] Filed: Aug. 10, 1990

[51] Int. Cl.$^5$ .............. G06F 3/02; G06F 3/023; G06F 3/14; G06F 11/32
[52] U.S. Cl. .............. 395/275; 364/234; 364/234.4; 364/236.8; 364/237.8; 364/237.9; 364/239.2; 364/239.7; 364/239.8; 364/239.9; 364/247.8; 364/265.5; 364/267.9; 364/239.3; 364/DIG. 1; 345/161
[58] Field of Search ............... 395/275, 200, 250, 800, 395/325, 500, 425, 550, 775, 700, 750, 725; 364/489, DIG. 1, DIG. 2; 340/709, 710

[56] References Cited

U.S. PATENT DOCUMENTS

| | | | |
|---|---|---|---|
| 4,222,564 | 9/1980 | Allen et al. | 273/369 |
| 4,495,642 | 1/1985 | Zellmer | 382/1 |
| 4,714,913 | 12/1987 | Cohen | 341/111 |
| 4,849,928 | 7/1989 | Hauck | 395/500 |
| 4,868,780 | 9/1989 | Stern | 364/900 |
| 4,903,251 | 2/1990 | Chapman | 368/156 |
| 5,007,050 | 4/1991 | Kasparian et al. | 370/77 |
| 5,042,070 | 8/1991 | Linna et al. | 381/59 |

Primary Examiner—Lawrence E. Anderson
Assistant Examiner—Dzung C. Nguyen
Attorney, Agent, or Firm—Robert J. Black

[57] ABSTRACT

An interface circuit for use between a radio control transmitter equipped with joysticks and a standard serial input port of a personal type computer. The interface circuitry includes a microcontroller operated as a reformatter for signals received from the remote control transmitter and a transistorized converter circuit connected between the output of the microcontroller and computer to convert the voltage level of signals output from the microcontroller in reformatted form.

10 Claims, 1 Drawing Sheet

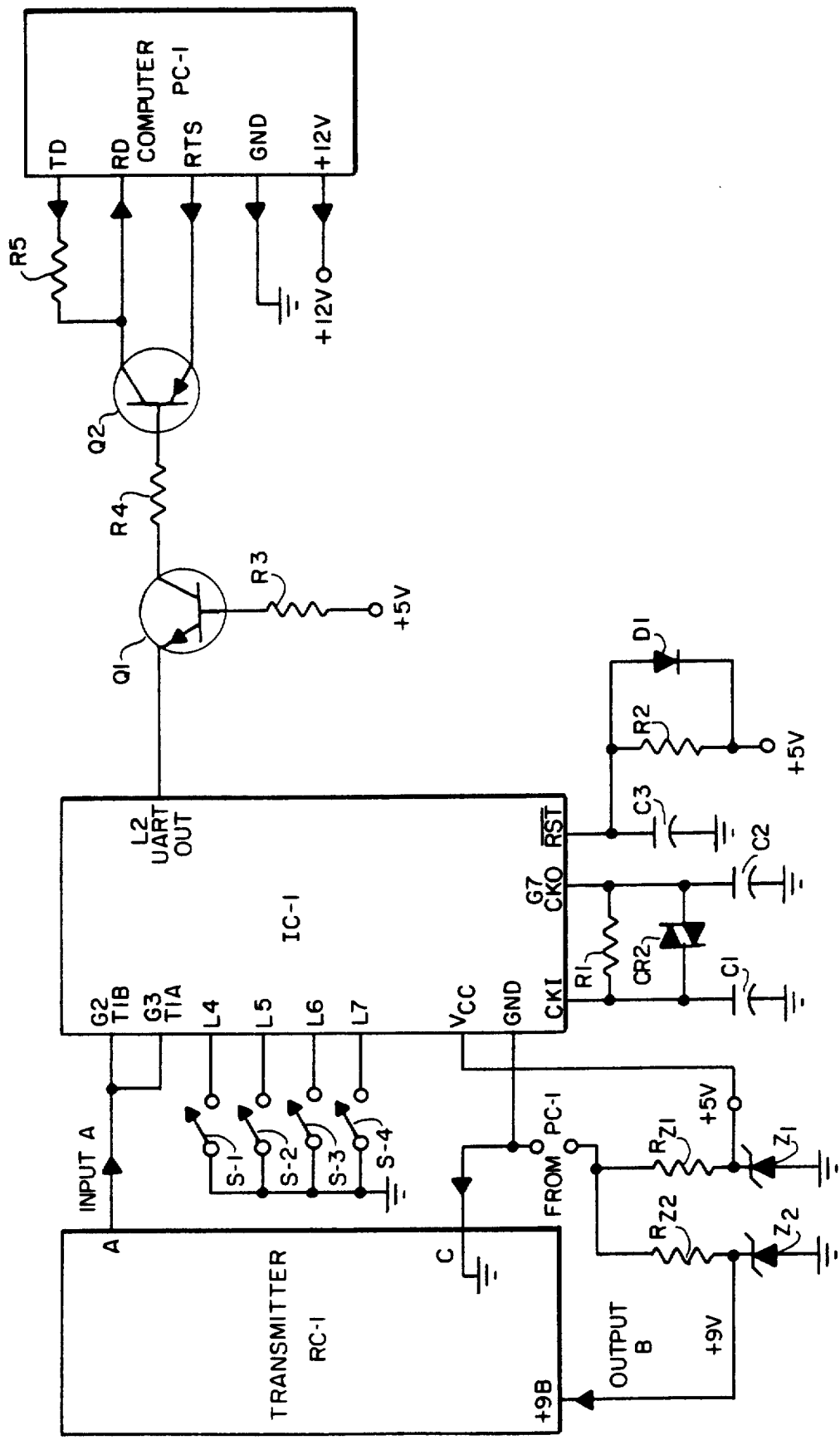

INTERFACE BETWEEN A RADIO CONTROL TRANSMITTER JOYSTICK CONTROL AND A COMPUTER SERIAL INPUT PORT

BACKGROUND OF THE INVENTION

1. Field of the Invention

The present invention pertains to remote control transmitters normally used together with associated receivers and servos to remotely controlled models such as airplanes, helicopters, boats, etc. More particularly, the invention pertains to an interface circuit arrangement for use between a radio control transmitter and a computer.

2. Background Art

Computer systems today utilize many different methods of receiving information from the user. Such methods include serial input/output ports, parallel input/output ports, with parallel and input referring to the sequence of information passed to the computer. Keyboards, bus expansion slots, cartridge slots, mouse ports, and joystick ports are also utilized.

Radio control (R/C) transmitters have been used together for many years with associated receivers and servos mechanisms to remotely control models of all types, including cars, airplanes, helicopters, and boats. Such remote control transmitters are widely used and available on a world-wide basis. Such units include many controllable inputs built into their basic circuitry, including switches, buttons, potentiometers, and multiple axis joysticks with trim adjustment. In addition, most radio control transmitters offer many built in user adjustable features such as adjustable control response curves, multiple setups for different vehicles, various control mixing and channel assignments, etc.

In the past, it has been possible for dedicated joysticks and switches to be interfaced into a computer. One example of this arrangement was taught in my U.S. Pat. No. 4,868,780 which issued on Sep. 19, 1989 and is assigned to the same assignee as the present application.

Accordingly, an interface that would allow an already available remote control transmitter equipped with joysticks and switches to be used as a computer input device would be most cost effective. Additionally, another advantage would be present if the user of the arrangement could use his own remote control transmitter, with its built in features, to control a computer simulation of the aircraft, car, or boat. Thus the training and learning value and familiarization with the equipment would be substantially enhanced in the simulation arrangement. Accordingly, it is the object of the present invention to allow existing joysticks and other controls included in remote control transmitters to be used for computer input.

SUMMARY OF THE INVENTION

In order to permit the owner of an available remote control transmitter to utilize his transmitter with all of its controls and features as a computer input device, the arrangement set forth in the following is suggested. I believe that the utilization of an existing remote control transmitter for computer input can be done by taking an available output of the remote control transmitter and interfacing it to a computer input/output port.

Outputs available from a remote control transmitter include the following:

1) modulated radio frequency energy, and
2) encoded data from a "buddy box" connection or from a "servo test" connection. The buddy box connection of a remote control transmitter is normally used to connect two transmitters together for training. In this instance, one transmitter's radio frequency modulator is used but is driven by the encoder section of either transmitter. Remote control transmitters that include such so-called trainer or buddy box connections include the Futaba FP-5UAP, manufactured by Futaba, the model X-347, manufactured by JR, and the Vanguard VG4R, manufactured by Sanwa.

The "servo test" output is typically utilized to connect to the receiver without transmitting radio frequency energy. This output is provided to test servo operation without interferring with others utilizing the same radio frequency. A typical radio equipped with direct servo test connection facility is that manufactured by Futaba as their model FB-9VAP.

In accordance with the present invention, encoded data from the buddy box output or servo test output is connected directly to a microcontroller for reformatting of the data available from the remote control transmitter. The microcontroller output is then placed through a buffering circuit that converts the signal from logic levels to a bi-polar format for utilization by a computer for training purposes. This bipolar signal output is then connected directly to a computer serial input/output port.

DESCRIPTION OF THE DRAWINGS

The present invention is described in detail below with reference to the accompanying drawing wherein:

FIG. 1 is a combination block and schematic diagram of an interface circuit arrangement between a radio control transmitter and a computer.

DESCRIPTION OF THE PREFERRED EMBODIMENT

Referring now to FIG. 1, a radio control transmitter RC1, like any of those noted above, its buddy box or servo test output is directly wired to the timer input of a microcontroller IC1, which in the present instance is found to be most easily implemented with a microcontroller such as the COP888CG single chip micro CMOS microcontroller manufactured by National Semiconductor. The microcontroller software utilizes the servo test 4 timer output from the remote control transmitter to determine the value of the data on each channel. It should be noted that the software program utilized in the microcontroller IC1 does not form a portion of the present invention, but rather it is only required that it provide the necessary function and operation as described herein.

The microcontroller IC1 software configures the microcontroller's universal asynchronous receive and transmit (UART) and then outputs the reformatted data from the UART output L2 as seen in FIG. 1. This output is then connected to a two transistor interface circuit consisting of transistors Q1 and Q2, as well as resistors, R3, R4, and R5. The two transistor interface converts the voltage level outputs from the microcontroller IC1 to voltages compatible with the electronic industry standard RS232 input of computer PC1. It should be noted that computer PC1 typically is of the personal computer type and may be implemented with any IBM PC compatible computers which utilize a serial port built in and may include such models as a PC brand 286/12, an Atari 520ST, and the Commodore Amiga 500.

This data present at the computer RS232 I/O port, which originated in the radio remote control transmitter, thus becomes available to be read in and and used by the software included in the computer.

A further understanding of the basic function of the circuit as shown in FIG. 1 would be as follows. It primarily is to interface the radio control transmitter RC1 to a computer RS232 I/O port utilizing a buddy box or servo test connection from the remote control transmitter. The three connector leads from the transmitter RC1 are connected to the inputs of microcontroller IC1. Output B is a +9 volt regulated power supply. Input C is a ground reference and input A is the remote control transmitters encoded output signal (before radio frequency (RF) modulation). The interface of the present circuitry is connected to the RS232 I/O port of computer PC1 utilizing five leads. TD is a negative voltage from the computer I/O port, RTS is a positive voltage from the computer I/O port. RD is the input bipolar signal sent to the computer I/O port, plus 12 volts and GND (ground reference) are also available. The TD and RTS leads have the proper voltage on them under control of the computer software (which can be set for these leads at either a mark voltage greater than 3 volts, or a space voltage less than 3 volts.

A connection for plus 12 volts on PC1 through resistor RZ1 is connected to zener diode Z1 to form a 5 volt regulator, while resistor RZ2 is connected to zener diode Z2 to form a 9 volt regulator. Positive 12 volts (from PC1) is connected to resistors RZ1 and RZ2 and input C. Resistor RZ1 is connected to the cathode of zener diode Z1. The anode of zener diode Z1 is connected to ground. Positive 5 volts is available at the cathode of zener diode Z1 and is used as a supply voltage for the interface. Resistor RZ2 is connected to the cathode of zener diode Z2. The anode of zener diode Z2 is connected to ground. Positive 9 volts is available at the cathode of zener diode Z2 and may be utilized as a supply voltage for the encoder section of the remote control transmitter.

The positive 12 volt power supply is taken from the RS232 connector as shown in the case of a Commodore Amiga or similar computer. Since some computers do not have positive 12 volts as available as an output, an external 12 volt power supply powered from an AC outlet, or from batteries, would be required for use of this device with some computers.

Integrated circuit IC1 as noted above is a COP888CG microcontroller. In the present invention it is utilized as a reformatter. Its input (input A) is connected to the timer inputs of the microcontroller, inputs T1A and T1B. These inputs can (under software control) measure the time between the rising and falling edges of pulses at this input. Input A is a serial bit stream of data from the remote control transmitter RC1. The coded information in this bit stream can be encoded in either a pulse code modulation (PCM) format or a pulse position modulation (PPM). Most current remote control transmitters can transmit from 2 to 9 channels of data which comprises one frame. One frame is transmitted every 16-20 milliseconds. Each channel represents the value (position) of one control in the device being controlled. In normal use of a remote control system, each channel controls the position of a servo attached to the remote control receiver.

In the present arrangement as shown in FIG. 1, inputs L4, L5, L6, and L7 are connected to interface switches S1, S2, S3, and S4. The position of each switch determines whether an open (no connection) or the presence of a grounded state at each of these inputs. Accordingly, in response, the microcontroller software program can input the state of the port units L4, L5, L6, and L7 and thus input the switch positions. These switches then are employed to indicate to the included software the format of the input to expect and what type of format to output. The $V_{cc}$ input is connected to the positive 5 volt output of the zener power supply to provide power to the microcontroller. The ground input is connected to the ground reference of the circuit.

Clock inputs CK1 and CK0 are connected to a resistor capacitor network consisting of resistors R1 and R2, capacitors C1 and C2 and a ceramic resonator CR1. This circuit is required for operation of the microcontroller clock. The reset input (-RST) is connected to an arrangement of capacitor C3, resistor R2, and diode D1. This is the usual recommended reset circuit which applies a reset pulse to the microcontroller when power is first applied to the circuitry.

The reformatted microcontroller output is taken from L2 of microcontroller IC1. This output can be configured to come from the internal UART output. This output is connected to the emitter of NPN transistor Q1. The base of transistor Q1 is connected to a positive 5 volt source through resistor R3. The collector of NPN transistor Q1 is connected to the base of PNP transistor Q2 through resistor R4. The emitter of PNP transistor Q2 is connected to the RTS lead of the computer RS232 I/O port associated with computer PC1. This lead will be set to a mark (positive voltage) by the computer. The collector of PNP transistor Q2 is connected to the RD lead of the computers RS232 I/O port. Resistor R5 connects the TD lead to the RD lead of the computers RS232 I/O port. The computers ground reference from the RS232 I/O port is connected to the interface circuit ground reference. The circuitry consisting of transistors Q1 and Q2, resistors R3, R4, and R5 is a simple example of a computer interface as taught by the present invention which is satisfactory for use in connecting the output of microcontroller IC1 to a computer such as PC1.

A further understanding of the present invention can be had by reference to the following wherein the example of typical operation is given.

As noted previously, inputs A, B, and C are connected to the buddy box output of a pulse position modulation remote control transmitter. Switches S1-S4 are then set to indicate that the input is pulse position modulation and is opposed to other formats such as pulse code modulation (PCM). This also indicates the baud rate.

The switch settings for each option are determined by the microcontroller software.

The microcontroller software does the following:

Initialization including configuration of the internal UART of microcontroller IC1. It measures the time between the falling edge and the next rising edge at input A. If this time is less than 2000 microseconds, it repeats the measurement on the next pulse. When the time is measured at greater than 2000 microseconds, the sync pulse occurring between frames has been located. The next measurement is the value of channel 1. The pulse width measurement is (calculated) converted to an 8 bit value. This value is then loaded into the UART output register and transmission is initiated. Subsequent pulses (channels) are processed as above until the next sync pulse is detected. At this point the software creates an extra byte that contains synchronization and security bits. The above process is repeated each 16000 microsecond frame. The resultant serial bit stream is applied to the emitter of NPN transistor Q1.

The microcontroller UART output at L2 can be one of two states. A logic "0" (less than one volt) or a logic "1" (near 5 volts). If the output is logic "1", there will be no current flowing from the base to the emitter of Q1, therefore Q1 will be off and will not allow the current to flow from the emitter to the base of Q2. Therefore Q2 will be off. Since lead TD from the computer RS232 I/O port is set to a negative voltage and transistor Q2 is off, the collector of transistor Q2 and lead RD will also be at a negative voltage.

When the microcontroller's UART output L2 switches to logic "0", there will be a current flow from positive 5 volts through resistor R3, through the base emitter junction of NPN transistor Q1 into pin L2 of the microcontroller. The forward biased base emitter junction will turn on transistor Q1 which will permit a current flow from the positive voltage present on lead RTS through the emitter base junction of PNP transistor Q2, then through resistor R4, through the "on" transistor Q1, into microcontroller lead L2. This will forward bias the emitter base junction of transistor Q2, turning it on. This creates a current path from the positive voltage present at lead RTS through transistor Q2 through resistor R5 to the negative voltage present at lead TD. Since the resistance of resistor R5 is much greater than that of the "on" transistor Q2, lead RD will switch from negative voltage to positive voltage. The net effect of this circuit between microcontroller output L2 and computer port input RD is to change the 0 volt (low), the positive 5 volts (high) logic levels into a positive voltage (low), negative voltage (high) bipolar bit stream compatible with the RS232 standard input. Since positive voltage and negative voltage are derived from the computer port output signals, the bipolar signal returned to the computer port on RD is voltage compatible with the computer port. The computer software can read the input port and input data originated from the remote control transmitter RC1 under its user operated controls (not shown).

While but a single embodiment of the present invention has been shown it will be obvious to those skilled in the art that numerous modifications may be made without departing from the spirit of the present invention which shall be limited only by the scope of the claims appended hereto.

What is claimed is:

1. An interface circuit for use between a radio remote control transmitter including at least one joystick control and at least one switch control, and a computer having a serial input port for receiving bipolar signals, said interface circuit comprising:
   said joystick control operated to transmit data through a reformatter in a coded bit stream employing pulse position modulation, or in the alternative, employing pulse code modulation;
   said reformatter, including a plurality of input circuits connected to said radio remote control transmitter joystick control, a converter circuit connected between an output circuit of said reformatter and said serial input port of said computer, said reformatter operated to configure signals representative of data in a coded bit stream from said joystick control transmitted to said input circuits for transmission to said computer, said converter circuit operated to convert voltage levels of signals output from said reformatter to voltages compatible with said serial input port of said computer whereby data originated at said radio remote control transmitter is read into and utilized by said computer.

2. An interface circuit as claimed in claim 1 wherein: said computer includes a power supply and said power supply includes circuit connections to said reformatter and to said converter circuit.

3. An interface circuit as claimed in claim 1 wherein: said radio remote control transmitter is equipped with non-radio frequency signal outputs connected directly to said reformatter.

4. An interface circuit as claimed in claim 1 wherein: said computer serial input port is of an electronic industry standard referred to as an RS232 input.

5. An interface circuit as claimed in claim 1 wherein: said interface is included in said radio remote control transmitter.

6. An interface circuit as claimed in claim 1 wherein: said converter circuit comprises a two stage transistorized circuit connected between said reformatter and said computer.

7. An interface circuit as claimed in claim 6 wherein: said two stage transistorized circuit comprises a NPN transistor having a first electrode connected to the output of said reformatter and a second electrode connected to the first electrode of a PNP transistor; a second and a third electrode of said PNP transistor connected to said computer.

8. An interface circuit as claimed in claim 1 wherein: said reformatter comprises an integrated circuit microcontroller, including a plurality of inputs and an output;
   said output connected to said converter circuit and said inputs connected to said radio remote control transmitter.

9. An interface circuit as claimed in claim 8 wherein: said integrated circuit microcontroller includes a universal asynchronous receive and transmit facility for use in outputting signals reformatted by said reformatter.

10. An interface circuit as claimed in claim 8 wherein: said radio remote control transmitter includes a servo test (or timer) output connected to said integrated circuit microcontroller, to determine a value for the data transmitted from said radio remote control transmitter to said reformatter.

* * * * *